J. A. REED.
Wheel.

No. 94,839.  Patented Sept. 14, 1869.

Witnesses:  Inventor:

United States Patent Office.

JOHN A. REED, OF NEW MARKET, NEW JERSEY.

Letters Patent No. 94,839, dated September 14, 1869.

IMPROVED CARRIAGE-WHEEL.

The Schedule referred to in these Letters Patent and making part of the same.

*To all whom it may concern:*

Be it known that I, JOHN A. REED, of New Market, in the county of Middlesex, and State of New Jersey, have invented and made a new and useful Improvement in Elastic Wheels; and I do hereby declare the following to be a full, clear, and exact description of the said invention, reference being had to the annexed drawing, making part of this specification, wherein—

Similar parts are denoted by the same letters.

Figure 1:
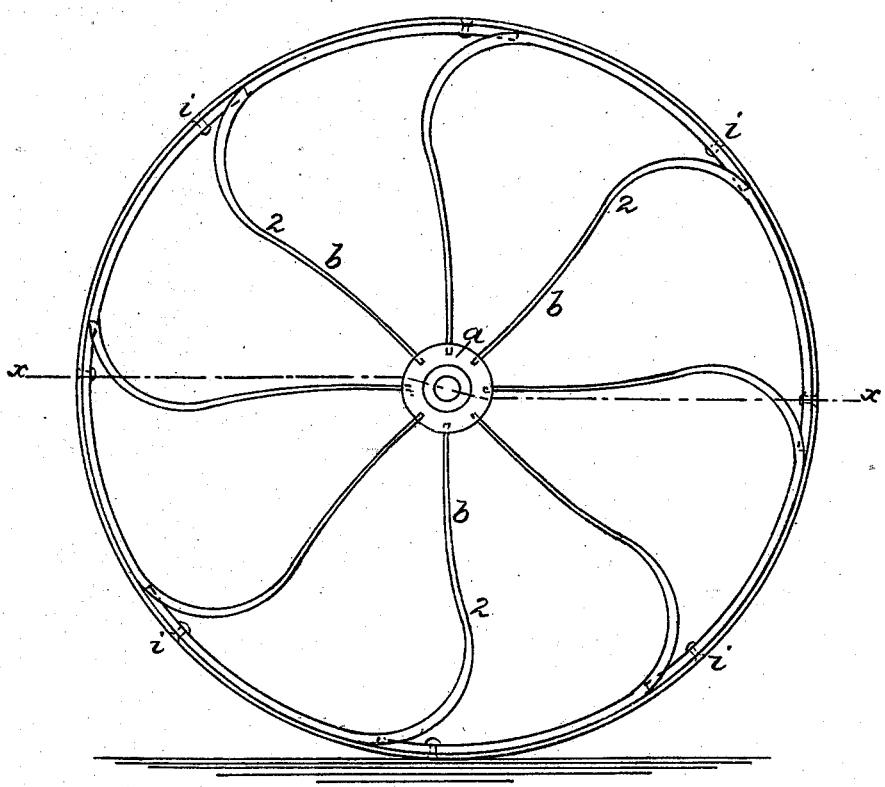
Figure 1 is a side elevation of said wheel.

Wheels for carriages and other vehicles have before been made with iron and steel spokes, to form springs and relieve the vehicle of concussion.

My invention is designed for removing the liability of the steel spring-spoke to break at its union with the felloe or tire; and said invention consists in a spring-spoke, attached at one end to the hub, and extending therefrom nearly radially, and then bent into a curve, to extend along the inside of the felloe or tire, and said curved portion is bent also into a semicircular or trough-shape, so as to stiffen the spring at this part, and prevent the same breaking by the concussion; and, in consequence of the extended length of the end of the spring-spoke, where it takes a bearing upon the inside of the felloe, there is no risk of the joint between the spring and felloe or tire being broken.

In the drawing—

$a$ is the hub.

$b\ b$, the spring-spoke, firmly attached in the hub $a$, and from near the point 2, where each spoke is curved around.

Figure 2:
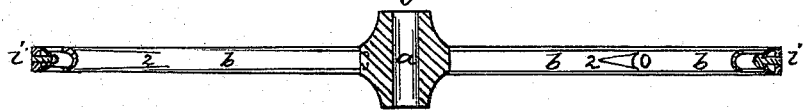
Figure 2 is a sectional plan at the line $x\ x$.

The spring-spoke is made with a trough-shaped section, as seen in fig. 2. This trough-shape commences gradually, and the spring continues along against the inside of the felloe or tire, until it reaches, or nearly so, the next spring-spoke.

The spokes are riveted or screwed to the tire or felloe at $i$, and, if desired, the end of one spring may set within the trough-shaped groove in the next spring, as represented.

This construction renders the spring-spoke much more durable than those before made, and prevents injury to the spring at the portion that is under strain, because the attaching rivet or screw is some distance from this point.

Wood felloes may be employed between the tire and spring-spoke, if desired.

What I claim, and desire to secure by Letters Patent, is—

A wheel, formed with metal spokes that extend in radial lines, or nearly so, and are bent into a trough-shape near their outer portions, where they curve around, and are attached upon the inside of the tire or felloe, as and for the purposes set forth.

In witness whereof, I have hereunto set my signature, this 18th day of March, A. D. 1869.

JOHN A. REED.

Witnesses:
CHAS. H. SMITH,
GEO. T. PINCKNEY.